United States Patent Office 2,730,604
Patented Jan. 10, 1956

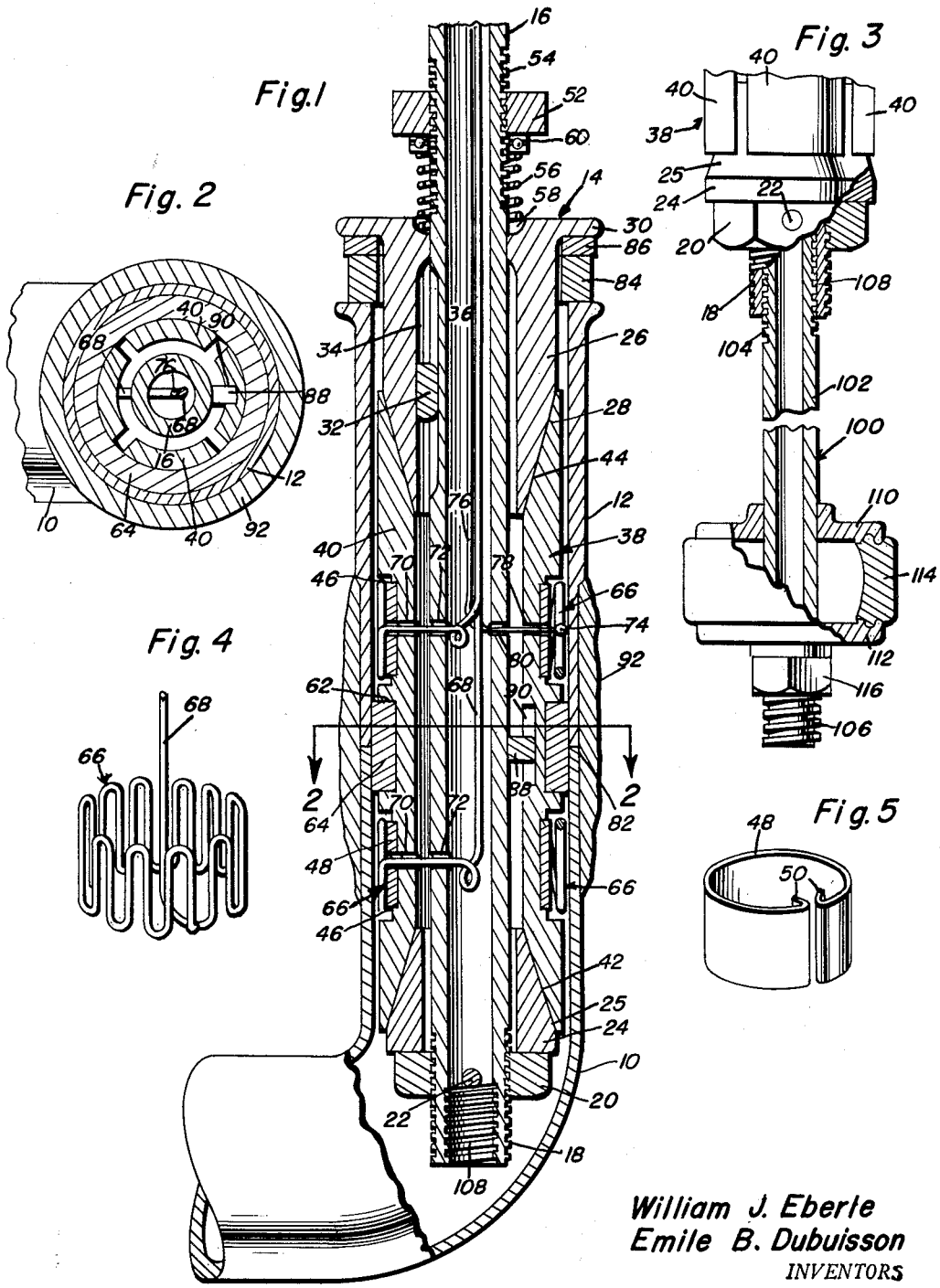
Jan. 10, 1956  W. J. EBERLE ET AL  2,730,604
PLUMBER'S TOOL
Filed Sept. 29, 1952
William J. Eberle
Emile B. Dubuisson
INVENTORS

2,730,604

PLUMBER'S TOOL

William J. Eberle and Emile D. Dubuisson, Elsa, Tex., said Dubuisson assignor to said Eberle Application September 29, 1952, Serial No. 312,087

7 Claims. (Cl. 219—21)

This invention relates in general to plumber's tools, and more specifically to a joint wiping device for facilitating the joining of sections of tubings and fittings.

The primary object of this invention is to provide an improved plumber's tool which may be utilized in the joining of tubular members, said plumber's tool being in the form of a self-sealing and self-centering lead wiping machine which is adapted to hold tubular members being joined in alignment and prevent the entrance of joining lead into the interior thereof.

Another object of this invention is to provide an improved plumber's tool facilitating the abutting joining of tubular members by a lead joint on the exterior thereof, said plumber's tool being adapted to align the members being joined and having a flexible wiping element which engages the interiors of the members being joined at their point of juncture.

Another object of this invention is to provide an improved plumber's tool for facilitating the joining of tubular members in end abutting relation, said tool being so constructed and designed whereby the same may be joined in series with other such tools for securing together a plurality of tubular members simultaneously.

Another object of this invention is to provide an improved plumber's tool which is adapted to align tubular elements during the joining thereof, said tool being provided with means for heating tubular elements being joined on opposite sides of a juncture therebetween whereby the joining of the same with a lead joint is greatly enhanced and the resulting joint is extremely strong.

Another object of this invention is to provide an improved plumber's tool which is of a relatively simple construction and which is formed of readily obtainable material whereby the same is economically feasible.

A further object of this invention is to provide an improved plumber's tool which includes an expansible mandrel having support means for aligning the same with a joint between tubular members being joined, said mandrel being provided with means for heating the tubular members on opposite sides of a line of juncture and a wiping element for sealing the interior of the joint against the entrance of lead into the tubular members, said heating means being provided with thermostatic control means for controlling the temperature of the members being joined.

A still further object of this invention is to provide an improved plumber's tool which is self-sealing and self-centering, said tool being adapted to be utilized in the joining together of tubular members in end abutting relation, said tool being provided with a detachable extension for centering and supporting inner ends of elongated tools.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 1 is a longitudinal sectional view taken through the centers of two tubular members being joined together, the section being also taken through the center of a plumber's tool facilitating the joining of the two tubular members and shows the general construction of the same;

Figure 2 is a fragmentary transverse sectional view taken substantially upon the plane indicated by the section line 2—2 of Figure 1 and shows the relationships of various elements of the tool with respect to each other and with respect to the tubular members being joined;

Figure 3 is a plan view of an extension for the inner end of the plumber's tool of Figure 1 and includes the inner end of the same, a portion of the extension being broken away and shown in section in order to clearly illustrate the construction thereof;

Figure 4 is a perspective view of a heating element of the plumber's tool of Figure 1 and shows the general outline of the same; and Figure 5 is a perspective view of a spring clip for securing together segments of a segmental mandrel of the plumber's tool of Figure 1.

Similar characters of reference designate similar or identical elements and portions throughout the different views of the drawings.

Referring now to the drawings in detail, it will be seen that there is illustrated in Figure 1 a tubular elbow 10 which is being joined in end abutting relation to a tubular ferrule 12. Utilized in the joining of the elbow 10 and the ferrule 12 is a plumber's tool, which is the subject of this invention, the tool being referred to in general by the reference numeral 14. The tool 14 is passed through the ferrule 12 and has an inner end disposed within the elbow 10 and is centered with respect to the line of juncture between the two.

The plumber's tool 14 includes an elongated tubular shaft 16 which has an externally threaded inner end 18 on which is mounted a stop member in the form of a nut 20. The nut 20 is retained against rotation by a transversely extending locking pin 22 which passes through both the nut 20 and the inner end portion of the tubular shaft 16. Mounted on the tubular shaft 16 and engaging the nut 20 is a stationary tapered cone 24 which has a conical mandrel engaging face 25.

Also carried by the tubular shaft 16, in spaced relation to the cone 24, is a ferrule receiver 26. The ferrule receiver 26 has an elongated tubular body portion which terminates at its inner end in a conical mandrel engaging face 28. The outer end of the body portion of the ferrule receiver is in the form of an outwardly extending annular flange 30. The ferrule receiver 26 is non-rotatably mounted on the shaft 16 for sliding movement only by a key 32 disposed in aligned keyways 34 and 36 in the ferrule receiver 26 and the tubular shaft 16, respectively.

Surrounding the central portion of the tubular shaft 16 and supported by the cone 24 and the ferrule receiver 26 is a segmental mandrel which is referred to in general by the reference numeral 38. The mandrel 38 is formed of a plurality of spaced sections 40 which have generally conical internal faces 42 and 44 at their inner and outer ends which are engaged by the conical faces 25 and 28, respectively.

The segments 40, as is best illustrated in Figure 1, are provided with spaced annular recesses 46 in the outer surfaces thereof. The annular recesses 46, which are positioned adjacent the ends of the sections 40 and the mandrel 38 have received therein substantially circular spring clips 48. The spring clips 48, as best illustrated in Figure 5, have adjacent end portions 50 which are inwardly turned so as to permit contraction of the spring clips. It will be understood that the spring clips 48 urge the sections 40 towards each other whereby their conical faces remain in tight engagement with the conical faces of the cone 24 and the ferrule receiver 26 and the smallest effective diameter of the mandrel 38 is retained thereby.

It will be understood that as the ferrule receiver 26 is moved along the tubular shaft 16 towards the fixed cone 24, the end portions of the sections 40 ride up on the conical faces 25 and 28 of the fixed cone 24 and the ferrule receiver 26, respectively, and the same are urged outwardly towards the inner surfaces of the elbow 10 and the ferrule 12 in which they are disposed.

In order that the ferrule receiver 26 may be moved towards the fixed cone 24, there is mounted on an outer end portion of the tubular shaft 16 a nut 52. The nut 52 is adjustably mounted on the tubular shaft by threaded engagement with external threads 54 on the tubular shaft. Positioned between the nut 52 and the outer end of the ferrule receiver 26 is a coil spring 56. The coil spring 56 is in surrounding relation with respect to a portion of the tubular shaft 16 and has its inner end disposed within a spring receiving recess 58 in the outer end of the ferrule receiver 26. Optionally positioned between the outer end of the spring 56 and the nut 52 is a thrust bearing 60 which facilitates the rotation of the nut 52 to urge the coil spring 56 towards the ferrule receiver 26.

Referring now to Figure 1 in particular, it will be seen that positioned intermediate the annular recesses 46 is a centrally located annular recess 62. Positioned within the annular recess 62 and projecting slightly outwardly thereof is an annular sealing ring 64. The annular sealing ring 64 is fabricated of malleable and elastic material that is heat, oil and alloy resistant and is sufficiently malleable to fill any minute irregularities on abutting surfaces to be joined.

It will be noted that the annular recesses 46 are of a greater depth than the thickness of the spring clips 48 disposed therein. Positioned in the outer portion of the annular recesses 46, which are of a greater width, are heating elements which are referred to in general by the reference numeral 66. As best illustrated in Figure 4, each heating element 66 is generally circular in outline and formed of tubular heating members repeatedly reversely bent so as to give the heating element 66 a vertical dimension and permit expansion and contraction of the same. While it is intended that the tubular member 68 which forms the heating element 66 be provided on its interior with an electrical heating wire, it will be seen that the means for heating the heating element 66 may also be liquid or gaseous.

Referring once again to Figure 1 in particular, it will be seen that the mandrel 38 has one segment 40 which is provided with bores 70 therethrough in alignment with the centers of the annular recesses 46 and bores 72 in the tubular shaft 16. Passing therethrough is one end of the tubular member 68 of each of the heating elements 66. The tubular member 68 of the heating element 66 may either be combined as they progress through the tubular shaft 16 or may form separate leaves through a power source or heating source as the case may be.

Associated with at least one of the heating elements 66 is a thermostatic bulb 74 which has connected thereto a lead wire or tube 76. The lead wire or tube passes through a transverse bore 78 and its associated segment of the mandrel 38, said bore communicating with the annular recess 46 in which the thermostatic bulb 74 is disposed. The lead wire or tube 76 also passes through an aligned bore 80 in the tubular shaft 16 and extends outwardly therethrough. The other end of the lead wire or tube 76 is connected to conventional thermostatic control means (not shown) for controlling either the power or heat supplied to the heating elements 66 in order that the temperature of the two elements being joined may be that desired.

When it is desired to join two tubular elements, such as the elbow 10 and the ferrule 12, the same are disposed over the plumber's tool 14 in the manner illustrated in Figure 1. The line of juncture 82 should be centered with respect to the sealing ring 64, which forms a joint wiping element, in order that lead forming the joint therebetween may not pass into the interiors thereof. In order to accomplish this, it will be readily seen that it will be necessary to properly position the ferrule receiver 26 with respect to the ferrule 12. Therefore, there is provided at least one annular spacer 84 which is positioned between the annular flange 30 of the ferrule receiver and the other end of the ferrule 12. Positioned between the spacer 84 and the annular flange 30 is a resilient sealing ring 86. By varying the size of the spacer 84, it will be seen that the ferrule receiver 26 can be positioned with respect to the ferrule 12 in such a manner that the sealing ring 64 will be centered with respect to the line of abutment 22 between the ferrule and the elbow.

After the plumber's tool 14 has been so positioned within the ferrule and the elbow, the nut 52 is tightened down with the result that the mandrel 38 is moved up over the conical face 28 of the ferrule receiver 26 due to the outward urging of the cone 24 which is fixed on the inner end of the tubular shaft 16. The cone 24 in cooperation with the ferrule receiver 26 urges the sections 40 of the mandrel 38 outwardly into close engagement with respect to the interior of the elbow and ferrule. In this manner the plumber's tool 14 is self-centering. It will be seen that when the sections of the mandrel 38 are urged outwardly, the sealing ring 64 tightly engages the inner surfaces of both the elbow and the ferrule so as to seal the joint therebetween from the interior thereof. In order that rotation of the mandrel 38 may be prevented and thereby prevent breakage of the tubular elements 68 and the lead wire or tube 76, the same is keyed onto the tubular shaft by a fixed key 88 carried by the shaft and positioned within a keyway 90 in one of the sections 40.

After the plumber's tool 14 has been properly positioned, heat is applied to both the elbow and ferrule in the vicinity of the joint therebetween by the heating element 66. After the elbow and ferrule have reached the desired temperature, a lead seal 92 is wiped on the exterior of the ferrule and elbow on opposite sides of the line of juncture 82 therebetween to form a rigid liquid tight joint.

While there has been illustrated only one such plumber's tool 14 for forming a single joint, it will be understood that a plurality of such tools may be formed in series and a number of joints be formed at the same time. However, it will be understood that the ends of the tubular members being joined should be sealed by means, such as the sealing ring 86, in order to prevent escape of heat from the interior thereof.

In the cases where the tubular shaft 16 is extremely long, the inner end thereof may be provided with an extension which is best illustrated in Figure 3. The extension, which is referred to in general by the reference number 100 includes a tubular shaft 102 which is externally threaded on its opposite ends as at 104 and 106. The tubular shaft 102 is of such a size whereby the external threads 104 may be threadedly engaged with internal threads 108 in the inner end of the tubular shaft 16.

Rigidly carried by the tubular shaft 102 adjacent the threaded end 106 is a collar 110. Spaced from the collar 110 and slidably mounted on the tubular shaft 102 is a second collar 112. The collars 110 and 112 have disposed therebetween a flexible sealing ring 114 which may be compressed to increase its effective diameter. Threadedly engaged on the threaded end 106 is an adjustable nut 116 which may be utilized in urging the annular flange 112 towards the annular flange 110 to compress the sealing ring 114 and vary its effective diameter.

When it is desired to utilize the extension 100, it will be seen that the sealing ring 114 is pressed to the point whereby its external diameter is substantially equal to the internal diameter of the tubular member in which it is intended to be positioned. Then the plumber's tool 14 with the extension 100 secured thereto is slid into a pair of tubular members being joined and the inner end of the tubular shaft 16 is centered with respect to the tubular member in which it is disposed. The plumber's tool 14 with the extension 100 attached thereto is then utilized in the manner set forth above.

It will be understood that the extension 100 is not limited to use with a single plumber's tool, but may be utilized at one end of a plurality of such tools arranged in series.

The operation of this device will be understood from the foregoing description of the details thereof, taken in connection with the above recited objects and the drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A joint forming tool comprising an expansible mandrel, heating elements carried by said mandrel for heating members being joined, a joint sealing element carried by said mandrel for positioning at a joint between members joined together, said heating elements being disposed on opposite sides of said joint sealing element.

2. A joint forming tool comprising an expansible mandrel, heating elements carried by said mandrel for heating members being joined, a joint sealing element carried by said mandrel for positioning at a joint between members being joined together, said mandrel being segmental, said heating elements being connected to said mandrel and expansible therewith.

3. A joint forming tool for tubular members comprising an expansible mandrel, means carried at opposite ends of said mandrel for selectively expanding said mandrel, annular recesses in the exterior surface of said mandrel, a centrally located joint sealing element seated in one of said recesses, heating elements disposed in others of said annular recesses on opposite sides of said joint sealing element.

4. A joint forming tool for tubular members comprising an expansible mandrel, means carried at opposite ends of said mandrel for selectively expanding said mandrel, annular recesses in the exterior surface of said mandrel, a centrally located joint sealing element seated in one of said recesses, heating elements disposed in others of said annular recesses on opposite sides of said joint sealing element, said joint sealing element and said heating elements being expansible with said mandrel.

5. A joint forming tool for tubular members comprising an expansible mandrel, means carried at opposite ends of said mandrel for selectively expanding said mandrel, annular recesses in the exterior surface of said mandrel, a centrally located joint sealing element seated in one of said recesses, heating elements disposed in others of said annular recesses on opposite sides of said joint sealing element, said joint sealing element and said heating elements being expansible with said mandrel, said heating elements being in the form of cylindrical electrical coils having sinusoidal windings.

6. A joint forming tool for tubular members comprising an expansible mandrel, means carried at opposite ends of said mandrel for selectively expanding said mandrel, annular recesses in the exterior surface of said mandrel, a centrally located joint sealing element seated in one of said recesses, heating elements disposed in others of said annular recesses on opposite sides of said joint sealing element, said joint sealing element and said heating elements being expansible with said mandrel, said heating elements being in the form of cylindrical electrical coils having sinusoidal windings, spring clips disposed in said other recesses and resiliently urging said mandrel to a contracted state, said heating elements being mounted on said clips.

7. A forming tool for facilitating the alignment and juncture of adjacent ends of tubular members to be joined to one another, said tool comprising an expansible mandrel for insertion within the tubular members, heating elements carried by said mandrel at longitudinally spaced points therealong for heating the tubular members adjacent their ends to be joined, a joint aligning and sealing member carried by said mandrel intermediate said heating elements.

References Cited in the file of this patent

UNITED STATES PATENTS

| | | |
|---|---|---|
| 914,743 | McDonald | Mar. 9, 1909 |
| 1,696,455 | Rupley | Dec. 25, 1928 |
| 1,751,510 | Cunningham | Mar. 25, 1930 |
| 1,840,584 | Jerabek et al. | Jan. 12, 1932 |
| 2,176,602 | Beck et al. | Oct. 17, 1939 |
| 2,277,601 | Morgan | Mar. 24, 1942 |
| 2,353,868 | Bisbee et al. | July 18, 1944 |
| 2,399,646 | Linden | May 7, 1946 |

FOREIGN PATENTS

| | | |
|---|---|---|
| 114,091 | Great Britain | Mar. 21, 1918 |
| 142,253 | Great Britain | May 6, 1920 |